(12) United States Patent
Schwartz et al.

(10) Patent No.: US 9,998,636 B2
(45) Date of Patent: Jun. 12, 2018

(54) METHOD TO REMOVE THE SPECTRAL COMPONENTS OF ILLUMINATION AND BACKGROUND FROM MULTI-SPECTRAL AND HYPER-SPECTRAL IMAGES

(71) Applicant: Center for Quantitative Cytometry, Sam Juam, PR (US)

(72) Inventors: Abraham Schwartz, San Juan, PR (US); Philip Sherman, Cleveland, OH (US); Peter Ingram, Raleigh, NC (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days. days.

(21) Appl. No.: 15/588,602

(22) Filed: May 6, 2017

(65) Prior Publication Data
US 2018/0020129 A1   Jan. 18, 2018

Related U.S. Application Data

(60) Provisional application No. 62/363,384, filed on Jul. 18, 2016.

(51) Int. Cl.
| | |
|---|---|
| *H04N 5/217* | (2011.01) |
| *G01J 3/28* | (2006.01) |
| *H04N 5/232* | (2006.01) |
| *H04N 9/09* | (2006.01) |

(52) U.S. Cl.
CPC .......... *H04N 5/2173* (2013.01); *G01J 3/2823* (2013.01); *H04N 5/23229* (2013.01); *H04N 9/09* (2013.01); *G01J 2003/2826* (2013.01)

(58) Field of Classification Search
CPC .... H04N 5/2173; H04N 5/23229; H04N 9/09; G01J 3/2823; G01J 2003/2826
See application file for complete search history.

(56) References Cited

U.S. PATENT DOCUMENTS

| | | | |
|---|---|---|---|
| 7,796,833 B2 * | 9/2010 | Polonskiy | G01J 3/28 382/103 |
| 8,717,551 B2 * | 5/2014 | Baraniuk | G01J 3/2823 356/121 |
| 2008/0046217 A1 * | 2/2008 | Polonskiy | G01J 3/28 702/179 |
| 2013/0083312 A1 * | 4/2013 | Baraniuk | G01J 3/2823 356/51 |
| 2014/0085629 A1 * | 3/2014 | Bodkin | G01J 3/021 356/300 |

* cited by examiner

*Primary Examiner* — Nicholas Giles
(74) *Attorney, Agent, or Firm* — Hoglund & Pamias, PSC; Roberto J. Rios

(57) ABSTRACT

The present invention is a method of removing the illumination and background spectral components thus isolating spectra from multi-spectral and hyper-spectral data cubes. The invention accomplishes this by first balancing a reference and sample data cubes for each spectra associated with each location, or pixel/voxel, in the spatial image. The set of residual spectra produced in the balancing step is used to obtain and correct a new set of reference spectra that is used to remove the illumination and background components in a sample data cube.

19 Claims, 6 Drawing Sheets

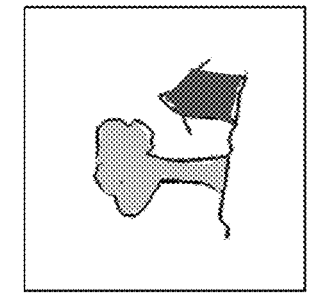
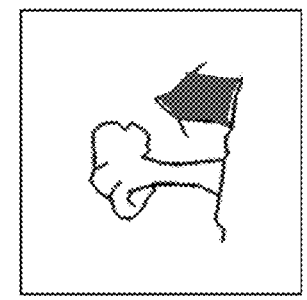
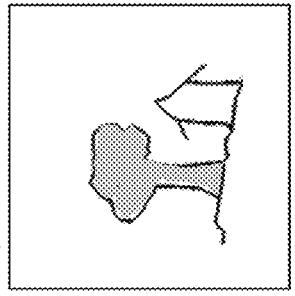
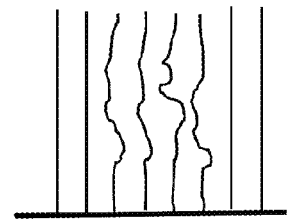
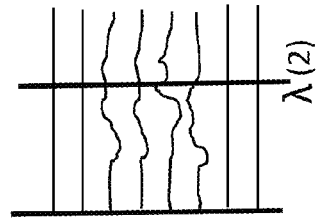
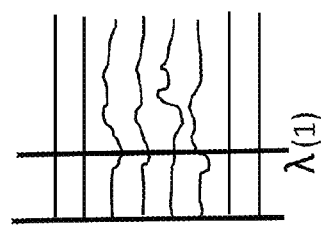
Construction of the Spectral Images
Step D
Image from spatial image (x, y) at wavelength (λ)
Image from spatial image (x, y) at wavelength (Y)
Image from spatial image (x, y) at all wavelengths (λ)
Figure 5

Equivalent Alternatives to obtain Data Cubes
without illumination and background spectral components

| Type of Data | Abreviation |
|---|---|
| Data Cube | DC |
| Reference Data Cube (empty) | RDC |
| Sample Reference Data Cube (empty) | SRDC |
| Residual Data Cube | ResDC |
| Balanced Data Cube | BDC |
| New Sample Data Cube | NSDC |
| New Reference Data Cube | NRDC |
| Pure Sample Data Cube | PSDC |

Option 1

SRDC - RDC = ResDC

SRDC – [RDC + ResDC] = BDC     Verifying a balanced set of cameras

NSDC – [NRDC + ResDC] = PSDC   Data Cube free of illumination and background

Option 2

RDC - SRDC = ResDC

[SRDC - ResDC ] – [RDC] = BDC     Verifying a balanced set of cameras

[NSDC – ResDC ] - NRDC  = PSDC   Data Cube free of illumination and background

Figure 6

METHOD TO REMOVE THE SPECTRAL COMPONENTS OF ILLUMINATION AND BACKGROUND FROM MULTI-SPECTRAL AND HYPER-SPECTRAL IMAGES

TECHNICAL FIELD

The invention relates to a method of improving multi-spectral and hyper-spectral images across a wide spectral range by eliminating the illumination and background spectral components.

BACKGROUND OF THE INVENTION

In general terms, there are only two ways of forming an image. Either every component in an image is formed simultaneously or it is formed sequentially, pixel-by-pixel or voxel by voxel. Visual images formed by the human eye, as well as, with photographic cameras are constructed using three ranges of the visible spectrum, red, green and blue. Multi-spectral and hyper-spectral images are formed using greater numbers of smaller electromagnetic energy ranges, as well as, energies that extend into the infrared spectral range. Multi-spectra are derived from multiple exposures of a scene through several specific ranged band pass filters. Exposing an array of detectors (e.g., CCD chips,) to the illumination reflected from an optical diffraction grating forms hyper-spectra.

There are a number of different approaches to obtain data sets for multi-spectral and hyper-spectral imaging, including: 1) spatial scanning where each two-dimensional sensor output represents a full slit spectrum, 2) spectral scanning where each two-dimensional output represents a monochromatic spectral map, 3) non-scanning where a single two-dimensional sensor output contains all spatial, and 4) spectral data and spatial-spectral scanning where each two dimensional sensor output represents a wavelength-coded spatial map of the scene. In all these cases, the spatial and spectral data can be represented as a three-dimensional structure, referred to as a data cube, where spatial image dimensions are represented on two axes (x, y) and the spectral dimension is represented on a third wavelength axis ($\lambda$).

Combining visual data with multi-spectral or hyper-spectral data, into a data cube, has the advantage of including spectral information with every position in the image, e.g., each pixel of a visual digital image. This correlation serves for example to provide chemical identification signatures of objects in the visual images.

Over the past several decades, the application of multi-spectral and hyper-spectral imaging has become increasingly wide spread in fields such as geography, agriculture, forestry, oceanographic and environmental research, forensics, surveillance, medicine, and astronomy. These imaging technologies also help remote identification of material components from aircraft, satellites, and space stations.

In most of the outdoor applications, the sun is used as a source of illumination in performing multi-spectral and hyper-spectral imaging. The analysis of multi-spectra and hyper-spectra are complicated even in the case of a single material mostly due to the spectral components of illuminating light giving rise to absorption, transmission, reflection, and fluorescence originating from the material under study. When performing multi-spectral and hyper-spectral imaging on a heterogeneous field, even greater complexity is introduced into the resulting spectra due to multiple materials. Moreover, the illumination and background spectral components can overwhelm and hide the spectral components of the materials of interest in the imaging field.

A great deal of effort has been focused on corrective modeling to reduce the impact of the illumination and background spectral components. For example, the spectrum of black body radiation that closely models the spectrum of the sun has been used as an underlying model to remove the illumination components of the spectrum. However, this does not accurately account for the small spectral components present in the solar spectra due to the heavy elements in the sun and molecular compounds in the earth's atmosphere. Attempts to subtract this model from real multi- and hyper-spectral data require further correction depending on the solar spectrum at the time of acquisition since the solar spectrum is a function of its incidence at different times of the day. Complex models of atmospheric particulates and humidity have also been derived to eliminate these background components from spectra. However, these corrective attempts are only models and may not be relevant to the specific conditions when the data was obtained.

A spectrum taken over a wide range of electromagnetic wavelengths may contain several spectral components that are specifically characteristic of a material, such as absorption, transmission, fluorescence, reflection, Raman scatter, etc., as well as, components that may hide these characteristics, e.g., electronic and mechanical instrument noise, background and illumination spectrum. This is especially true with multi-spectral and hyper-spectral imaging in sunlight illumination when analyzing a surface where the reflected illumination and background components are major components that can hide the intrinsic spectral characteristics of the material, particularly fluorescence spectral components.

Hyper-spectral images are produced by simultaneously acquiring numerous images from adjacent narrow wavelength bands and combining them together into a continuous spectrum so as each spatial pixel has its complete related spectrum. The narrow wavelength bands are defined by digital selection from the image's spectrum produced by a grating or prism. Some hyper-spectral cameras use over 250 wavelength bands, whereas, multi-spectral may only use as many as 10 optical filters to produce separate wavelength images that are combined into a continuous spectrum associated with each spatial pixel.

With both the hyper-spectral and multi-spectral images, the illumination components are still present in the resulting spectral image and in the present invention, are considered noise that may be hiding the intrinsic spectral components of the material of interest. This is especially true when trying to detect fluorescence properties where the illumination components overwhelm any emission components. Normally in fluorescent spectroscopy, a single narrow wavelength illumination band is absorbed to excite the material and a long pass barrier filter is used to block out the illumination. Such an approach for hyper-spectral and multi-spectral imaging would be extremely limiting with respect to getting complete spectral information.

SUMMARY OF THE INVENTION

The present invention removes the illumination and background spectral components from imaging data cubes of multi-spectra and hyper-spectra using a filter-less methodology based on the method described in U.S. Pat. No. 9,435,687, incorporated herein by reference in its entirety. Specifically, this methodology is applied to the spectral data associated with each pixel, or voxel, in the visual image of the data cubes. Data cubes can then generate spectral images that do not have any spectral components of the illumination and/or background herein referred to as Noise-Free Data Cubes. The present invention also easily allows the detection of fluorescent properties without limiting detection of the other intrinsic spectral properties of the material of interest.

BRIEF DESCRIPTION OF THE DRAWINGS

Further features and advantages of the invention will become apparent from the following detailed description taken in conjunction with the accompanying figures showing illustrative embodiments of the invention, in which:

FIG. 5 shows different spectral images obtained by selecting specific wavelength columns (λ), according to the present invention.

FIG. 6 shows a variation of the methodology providing the same result, according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
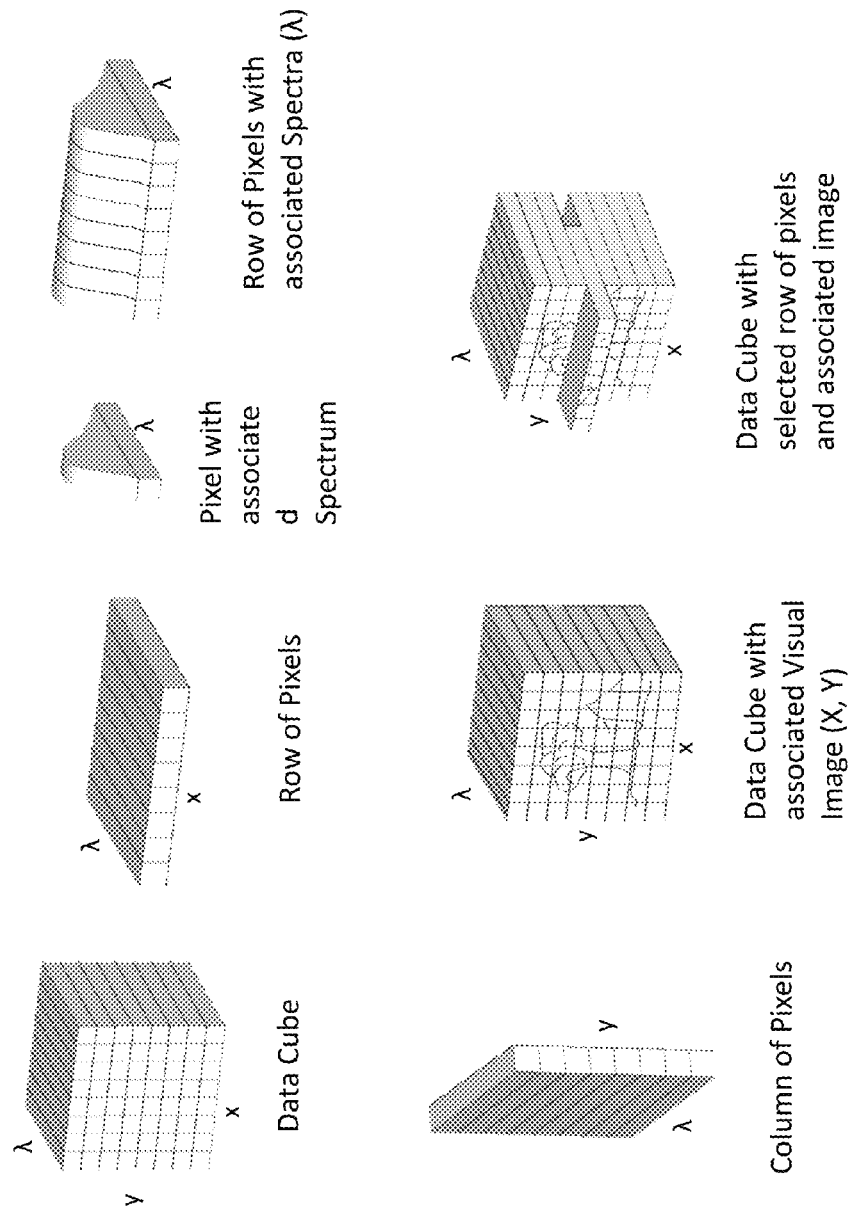
FIG. 1 shows the structure of a data cube where the visual image is presented on a two-dimensional surface (x, y) and the spectral data associated with each pixel is displayed on the orthogonal axis (λ).

The invention is applied to hyper-spectral and multi-spectral data cubes as shown in FIG. 1. This methodology requires two hyper-spectral or multi-spectral cameras or data sources used to obtain a reference data cube and a sample data cube, respectively, of empty space at the same time and under the same environmental conditions such that the input spectral data in the empty reference data cube and the empty sample data cube are the same. The outputs of the cameras or sources are then balanced so that all spectral intensity values of the resulting data cube, referred to as the Balanced Data Cube, are all zero. This indicates that there are no spectral illumination and background components present in the Balanced Data Cube. Thereafter, when data cubes from the balanced cameras are obtained from an area of interest, then only the spectral components of the material of interest remains in the resulting data cube, referred to as the Noise-Free Data Cube.

Figure 2:
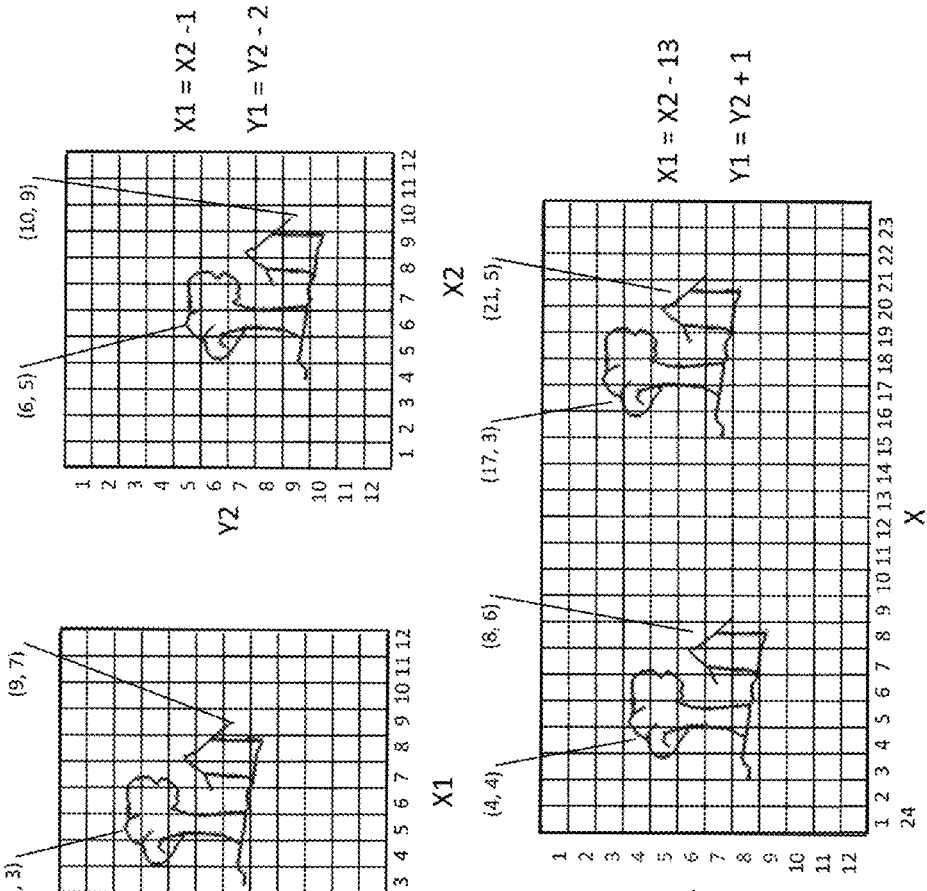
FIG. 2a shows an illustration of the alignment of a spatial image of the reference and sample data cubes on different digital arrays, according to the present invention.
FIG. 2b shows an illustration of the alignment of a spatial image of the reference and sample data cubes on a single digital array, according to the present invention.
Figure 3:
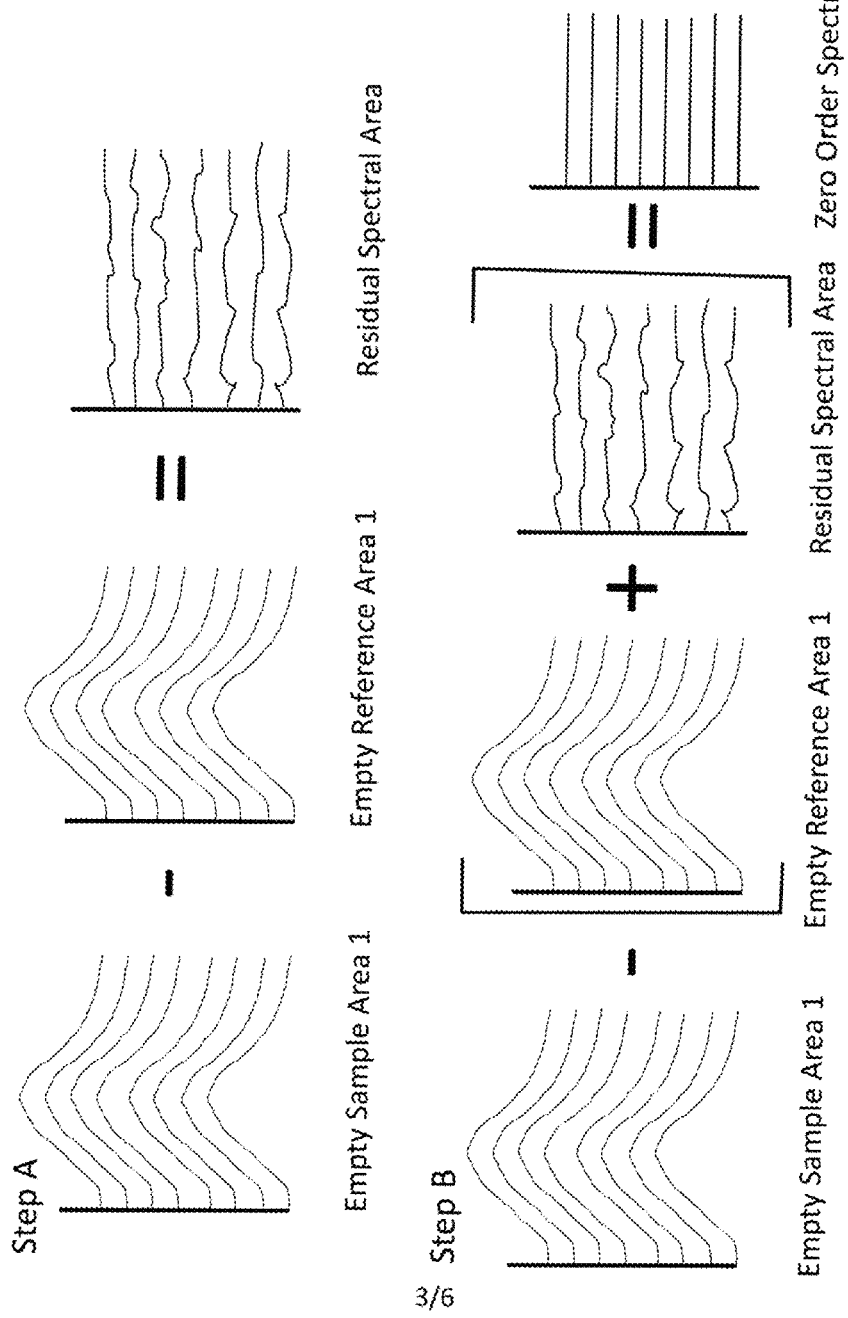
FIG. 3 shows spectral balancing of a row of pixels to obtain a data cube containing only Zero Order Spectra, according to the present invention.
Figure 4:
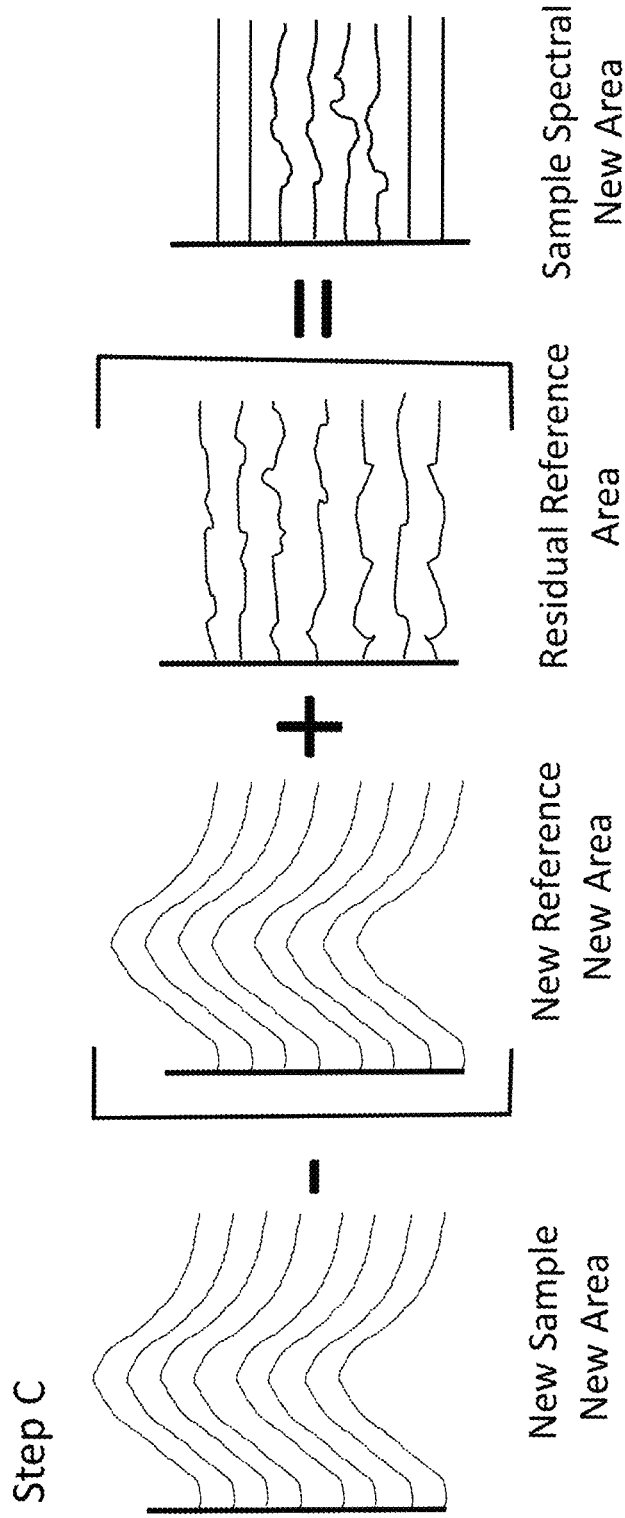
FIG. 4 shows how new reference spectral data is corrected and how the corrected reference spectra is removed from the sample data cube to yield a sample data cube without illumination and background spectral components, according to the present invention.

The general methodology of the invention will be described now in conjunction with FIGS. 2-4. First, the digital images (x, y) of the reference and sample data cubes must be aligned such that the spatial and spectral addresses (x, y) of the reference and sample data cubes correspond to each other. Alignment can be as simple as finding a single common point (x, y) on the reference and sample to simply shift the two images into alignment, or use two common points that allow a shift and rotation to align the images. More sophisticated methodologies involve resizing of the images or involve matching multiple points throughout the two images. This alignment can be accomplished with widely available image processing software that can align all spatial details from the reference and spectral data cubes. FIG. 2a illustrates this step when the same image is aligned on two separate digital arrays. As can be appreciated, the same image is shown on different areas of the arrays such that for example, the image portion associated with pixel (5,3) on the left array corresponds to same image portion associated with pixel (6,5) on the right array (i.e., X1=X2−1, Y1=Y2−2). Alternatively, the same image can also be aligned on two separate sections on the same digital array as shown in FIG. 2b. In this case, the image portion associated with pixel (4,4) on the left section of the array corresponds to same image portion associated with pixel (17,3) on the right section of array (i.e., X1=X2+13, Y1=Y2+1). This way a relationship is establish between every pixel on both images allowing complete alignment.

The data cube is comprised of the spatial image plane (x, y) and a spectrum (x, y, λ) associated with each spatial image position (x, y) as illustrated on FIG. 1. Along the spectral (λ), the profile of the spectrum is defined by specific relative intensities characteristic of the materials in the spatial image. The outputs of the two cameras or sources are then balanced such that there are no spectral component intensities of the illumination and background in the resulting Balanced Data Cube. This is accomplished by subtracting the spectral intensities of the reference spectra, pixel by pixel, from the sample spectra, respectively. This generates a Residual Spectrum for each pixel of the digital image (FIG. 3). This difference arises from differences in the intrinsic characteristics of the two specific cameras or sources. The Residual Spectrum associated with each digital image pixel is then added back to the spectrum of each respective reference spectrum and each resulting spectrum is then subtracted from the respective sample spectrum. This results in a data cube where all the spectral intensities are zero, or a Zero Order Spectra associated with each pixel of the digital image (FIG. 3). In other words, the Balanced Data Cube is composed of a digital image and its associated Zero Order Spectra. Generating a complete set of Zero Order Spectra in the Balanced Data Cube demonstrates that the cameras or sources are intrinsically balanced and there are no illumination and background spectral components in the Balanced Data Cube. Spectral images (FIG. 5) can now be generated after carrying out the last part of the invention methodology as explained below.

New reference and sample data cubes of areas of interest are obtained at the same time and under the same environmental conditions. The sample area will contain material of interest and the reference area may be: a) empty space that will generate images containing the material of interest and the background, or b) an area having the same background as the area containing the material of interest that will generate images containing only the material of interest.

The Noise-Free Data Cube of the sample area is generated by first adding the corresponding Residual Spectra to the new respective reference spectra of the new set of data cubes. This step is necessary to correct the reference spectra to maintain the balance of the two cameras. The corrected reference spectra are then subtracted from the corresponding spectra in the sample data cube. The resulting Noise-Free Data Cube is now absent of spectral components of illumination, or illumination and background, depending on the choice of the reference.

The Noise-Free Data Cube can now be analyzed and displayed by normal methods and routines. For example, the spectral image of a specific wavelength or set of wavelengths can be generated by digitally stacking the sections of the data cube corresponding to the chosen wavelengths. This spectral image can then be superimposed onto the digital image to obtain the location and distribution of the material of interest. With the removal of the spectral components of illumination and background, the spectra reveal a much clearer picture of the spectral signature of interest. In addition, identification of individual materials will be simplified since more of the materials intrinsic spectral components will be unmasked due to the removal of the illumination and background components. The degree of de-convolution is also simplified by eliminating the illumination and background components such that identification of the materials is more easily identified.

It should be noted that the same Noise-Free Data Cube can also be obtained in an equivalent manner by subtracting the Residual Spectral Data from the sample spectral data and then subtracting the residual data from the corrected sample spectral data, as explained on FIG. 6.

MODALITIES OF THE INVENTION

Methods of Acquisition of the Data Cubes
Mode 1

The preferred and most straight forward method of data cube acquisition is to use a set of two multi-spectral or hyper-spectral cameras of the same make and model, to obtain the data cubes of empty space, e.g., the sky, by the set of cameras at the same time and under the same conditions. Using the same make and model cameras simplifies the data alignment because both cameras use the same pixel arrays. By obtaining Zero Order Spectra from every spectral pixel, a Balanced Data Cube is obtained. New reference and sample data cubes can now be taken. However, when using an empty space as the new reference, applying the present invention to the data cubes only eliminates the illumination components from the Noise-Free Data Cube. This is useful when the components of the background are also of interest in the analysis. However, if only the specific material is of interest, then the illumination and background spectral components can be removed from the image using a reference area that contains the same background as the sample area. For example, if the material of interest were floating on the surface of the ocean, then the reference area of the same water would be chosen far from the sample area that is known to be free of the material of interest.

Mode 2

An alternative method would be to use a single camera that is adapted to accommodate two data sources, namely the reference and sample data cubes by directing the data cubes onto a single pixel array where the data for the reference and sample are positioned in separate areas of a single array (FIG. 2b). To accomplish this, the optical path would have to be carefully defined, e.g., via coherent fiber optics or prisms, such that the reference and sample spectra may be correlated to representative pixels onto the single pixel array. In the case where one camera is fitted with two separate light paths, these paths are considered in terms of this invention, as two separate cameras with respect to obtaining reference and sample data cubes.

Mode 3

A less rigorous method of removing the spectral components of the illumination can be used when the only source of data is the reflecting sample area. This method may be applied to multi-spectral imaging where the reference data cube is obtained from a strongly defocused image of the sample area and the sample data cube is obtained with the highly-focused image. The average intensity value of the brightest defocused region through each filter of the multi-spectral camera is measured and serves as the reference value for the data taken with a particular filter of the multi-spectral camera. The single intensity value determined for each filter of the defocused region is subtracted from the intensity value of each pixel in the array of the focused sample area taken with the same filter. This resulting value represents an approximation of the spectral value the pixel without the illumination component.

EXAMPLES

Methods of Obtaining Data Cubes for Analysis According to the Invention:

A. The preferred method for this invention to obtain data cubes containing spectral components of the material of interest and the background.
   Step 1. Two hyper-spectral or multi-spectral cameras (serving as a reference camera and a sample camera) of the same make and model are mounted on a cross bar such that each may independently aimed at different selected imaging areas.
   Step 2. Both cameras are aimed at the same area of clear sky in a direction away from the sun.
   Step 3. Each camera obtains a data cube of this common area of the sky whereas the data cube only contains spectral components of the natural illumination and aerosols and particulates in the atmosphere at the time.
   Step 4. The sample camera is then aimed at the imaging area of interest while the reference camera remains aimed at the clear sky.
   Step 5. Both cameras obtain a second set of data cubes of the respective imaging areas indicated in Step 4.

B. The preferred method for this invention to obtain data cubes containing only the material of interest.
   Step 1. Two hyper-spectral or multi-spectral cameras (serving as a reference camera and a sample camera) of the same make and model are mounted on a cross bar such that each may independently aimed at selected imaging areas.
   Step 2. Both cameras are aimed at the same area that is representative of the background in which the material of interest is known to be absent.
   Step 3. Each camera obtains a data cube of this common area of background whereas the data cube only contains spectral components of the natural illumination, aerosols and particulates, and the background in which the material of interest may be found.
   Step 4. The sample camera is then aimed at the imaging area of interest while the reference camera remains aimed at the area representative of the background.
   Step 5. Both cameras obtain a second set of data cubes of the respective imaging areas indicated in Step 4.

C. The preferred method for this invention where only the sample area is available from which to obtain data cubes. (For example, in Astronomy)
   Step 1. A single hyper-spectral or multi-spectral camera is aimed at the sample area.

Step 2. The camera is carefully focused on the sample area and data are obtained through each filter of the camera.

Step 3. The camera is then highly defocused to the point that the areas of the image appear to defuse into one another and a second data cube is obtained through each filter of the camera.

The above examples are only shown as preferred methods but are not limiting examples of how to obtain data cubes according to the present invention.

Processing the Data Cubes According to the Invention

Alignment of the Data Cubes:

Step 1. Obtain a reference and sample data cubes from a common detail-rich target.

Step 2. Identify the addresses of the visual image data (x, y) within the set of reference and sample data cubes, as well as, the addresses of the spectral data (x, y, $\lambda$) associated with each pixel of the spatial image.

Step 3. Align the two visual images such that the x, y coordinates of each detail of the visual images have the same location in the aligned images for both data cubes, such that the positions of the spectral data (x, y, $\lambda$) are also the same in both data cubes.

Balancing the Camera Outputs:

Step 1. Obtain data cubes from each camera of the same empty reference area (devoid of sample and background material).

Step 2. Subtract the spectral intensity of each empty reference pixel ($x_{re}$, $y_{re}$, $\lambda_{re}$) from the corresponding spectral intensity of each empty sample pixel ($x_{se}$, $y_{se}$, $\lambda_{se}$). The result is the Residual Spectral Data ($x_R$, $y_R$, $\lambda_R$), Step A on FIG. 3. Step 3. Add the Residual Spectral Data ($x_R$, $y_R$, $\lambda_R$) to the corresponding empty reference data ($x_r$, $y_r$, $\lambda_r$), then, subtract the resulting reference data [($x_r$, $y_r$, $\lambda_r$)+($x_R$, $y_R$, $\lambda_R$)] from the corresponding empty sample data ($x_{se}$, $y_{se}$, $\lambda_{se}$). The resulting spectral data form a data cube set of Zero Order Spectra where all spectral intensities throughout the data cube are zero. Zero intensity values indicate that the outputs of the cameras are balanced and that there are no spectral illumination and background components present in the Balanced Data Cube spectra, Step B on FIG. 3.

Obtaining a Data Cube Free of Illumination and Aerosol Components:

Step 1. Obtain data cubes when the sample camera is aimed at an area that contains the material of interest and the reference camera is aimed at the sky.

Step 2. Add the Residual Spectral Data ($x_R$, $y_R$, $\lambda_R$) to the corresponding new reference data ($x_r$, $y_r$, $\lambda_r$), then, subtract the resulting reference data [($x_r$, $y_r$, $\lambda_r$)+($x_R$, $y_R$, $\lambda_R$)] from the corresponding new sample data ($x_s$, $y_s$, $\lambda_s$), FIG. 4.

Step 3. The resulting data cube is free of spectral illumination and aerosol components leaving only the spectral components of the material of interest and the background in the image, FIG. 5.

Obtaining a Data Cube Free of Illumination, Aerosol, and Background, Components:

Step 1. Obtain data cubes when the sample camera is aimed at an area that contains the material of interest and the reference camera is aimed at an area that has the same background but devoid of the material of interest. For example, the sample area near the shore that contains red algae, and the reference area far from shore that is devoid of red algae.

Step 2. Add the Residual Spectral Data ($x_R$, $y_R$, $\lambda_R$) to the corresponding new reference data ($x_r$, $y_r$, $\lambda_r$), then, subtract the resulting reference data [($x_r$, $y_r$, $\lambda_r$)+($x_R$, $y_R$, $\lambda_R$)] from the corresponding new sample data ($x_s$, $y_s$, $\lambda_s$), Step C on FIG. 3.

Step 3. The resulting data cube ($x_z$, $y_z$, $\lambda_{z0}$) is free of spectral illumination, aerosol components, and ands background components leaving only the spectral components of the material of interest in the data cube, Step D on FIG. 3.

As can be appreciated on FIG. 5, the spectral images can be constructed and analyzed so that different information can be obtained from the same image at different wavelengths.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A method for removing spectral components of illumination energy and background from multi-spectral and hyper-spectral data cubes containing spatial and spectral images, the method comprising:

aligning a data cube of a sample spectral camera with a data cube of a reference spectral camera;

obtaining an empty sample data cube ($x_{se}$, $y_{se}$, $\lambda_{se}$) from said sample spectral camera directed at a first area and an empty reference data cube ($x_{re}$, $y_{re}$, $\lambda_{re}$) from said reference spectral camera directed at a second area;

subtracting a spectral intensity of each pixel of said empty reference data cube ($x_{re}$, $y_{re}$, $\lambda_{re}$) from a spectral intensity of a corresponding pixel of said empty sample data cube ($x_{se}$, $y_{se}$, $\lambda_{se}$) to obtain a residual spectral data cube ($x_R$, $y_R$, $\lambda_R$);

adding the spectral intensity of each pixel of the residual spectral data cube ($x_R$, $y_R$, $\lambda_R$) to the spectral intensity of a corresponding pixel of said empty reference data cube ($x_{re}$, $y_{re}$, $\lambda_{re}$) to obtain a resulting reference data cube [($x_{re}$, $y_{re}$, $\lambda_{re}$)+($x_R$, $y_R$, $\lambda_R$)];

subtracting the intensity of each pixel of the resulting reference data cube [($x_{re}$, $y_{re}$, $\lambda_{re}$)+($x_R$, $y_R$, $\lambda_R$)] from the intensity of a corresponding pixel of said empty sample data cube ($x_{se}$, $y_{se}$, $\lambda_{se}$) to obtain a zero order spectra data cube where all spectral intensities throughout the data cube are zero;

obtaining a sample data cube ($x_s$, $y_s$, $\lambda_s$) from said sample spectral camera directed at a third area and a reference data cube ($x_r$, $y_r$, $\lambda_r$) from said reference spectral camera directed at a fourth area;

adding the spectral intensity of each pixel of the residual spectral data cube ($x_R$, $y_R$, $\lambda_R$) to the spectral intensity of a corresponding pixel of said reference data cube ($x_r$, $y_r$, $\lambda_r$) to obtain a new resulting reference data cube [($x_r$, $y_r$, $\lambda_r$)+($x_R$, $y_R$, $\lambda_R$)]; and subtracting the spectral intensity of each pixel of the resulting reference data cube [($x_r$, $y_r$, $\lambda_r$)+($x_R$, $y_R$, $\lambda_R$)] from the intensity of a corresponding pixel of said sample data cube ($x_s$, $y_s$, $\lambda_s$) to obtain a noise-free data cube, effectively removing from said noise-free data cube at least one of: spectral illumination components, aerosol components, and background components.

2. The method of claim 1, wherein said sample spectral camera and said reference spectral camera are multi-spectral cameras and said spectral image is a multi-spectral image.

3. The method of claim 1, wherein said sample spectral camera and said reference spectral camera are hyper-spectral cameras and said spectral image is a hyper-spectral image.

4. The method of claim 1, wherein said first area and said second area are the same areas.

5. The method of claim 4, wherein said first area and said second area is an empty reference area devoid of sample and background material.

6. The method of claim 1, wherein said third area is an area that contains a material of interest and said fourth area is the sky.

7. The method of claim 6, wherein the noise-free data cube is free of spectral illumination components and spectral aerosol components leaving only the spectral components of the material of interest and the background in the noise-free data cube.

8. The method of claim 1, wherein said third area is an area that contains a material of interest and said fourth area is an area that has the same background where the material of interest is located but devoid of said material of interest.

9. The method of claim 8, wherein the noise-free data cube is free of spectral illumination components, spectral aerosol components and spectral background components leaving only the spectral components of the material of interest in the noise-free data cube.

10. A method for removing spectral components of illumination energy and background from multi-spectral and hyper-spectral data cubes containing spatial and spectral images, the method comprising:

aligning a data cube generated from a sample spectral source with a data cube generated from a reference spectral source;

generating an empty sample data cube $(x_{se}, y_{se}, \lambda_{se})$ from said sample spectral source directed at a first area and an empty reference data cube $(x_{re}, y_{re}, \lambda_{re})$ from said reference spectral source directed at a second area;

subtracting a spectral intensity of each pixel of said empty reference data cube $(x_{re}, y_{re}, \lambda_{re})$ from a spectral intensity of a corresponding pixel of said empty sample data cube $(x_{se}, y_{se}, \lambda_{se})$ to obtain a residual spectral data cube $(x_R, y_R, \lambda_R)$;

adding the spectral intensity of each pixel of the residual spectral data cube $(x_R, y_R, \lambda_R)$ to the spectral intensity of a corresponding pixel of said empty reference data cube $(x_{re}, y_{re}, \lambda_{re})$ to obtain a resulting reference data cube $[(x_{re}, y_{re}, \lambda_{re})+(x_R, y_R, \lambda_R)]$;

subtracting the intensity of each pixel of the resulting reference data cube $[(x_{re}, y_{re}, \lambda_{re})+(x_R, y_R, \lambda_R)]$ from the intensity of a corresponding pixel of said empty sample data cube $(x_{se}, y_{se}, \lambda_{se})$ to obtain a zero order spectra data cube where all spectral intensities throughout the data cube are zero;

generating a sample data cube $(x_s, y_s, \lambda_s)$ from said sample spectral source directed at a third area and a reference data cube $(x_r, y_r, \lambda_r)$ from said reference spectral source directed at a fourth area;

adding the spectral intensity of each pixel of the residual spectral data cube $(x_R, y_R, \lambda_R)$ to the spectral intensity of a corresponding pixel of said reference data cube $(x_r, y_r, \lambda_r)$ to obtain a new resulting reference data cube $[(x_r, y_r, \lambda_r)+(x_R, y_R, \lambda_R)]$; and subtracting the spectral intensity of each pixel of the new resulting reference data cube $[(x_r, y_r, \lambda_r)+(x_R, y_R, \lambda_R)]$ from the intensity of a corresponding pixel of said sample data cube $(x_s, y_s, \lambda_s)$ to obtain a noise-free data cube, effectively removing from said noise-free data cube at least one of: spectral illumination components, aerosol components, and background components.

11. The method of claim 10, wherein an output of said sample spectral source is directed to a first section on a CCD chip and an output of said reference spectral source is directed to a second section on said CCD chip.

12. The method of claim 10, wherein said sample spectral source and said reference spectral source are multi-spectral sources and said spectral image is a multi-spectral image.

13. The method of claim 10, wherein said sample spectral source and said reference spectral source are hyper-spectral sources and said spectral image is a hyper-spectral image.

14. The method of claim 10, wherein said first area and said second area are the same areas.

15. The method of claim 14, wherein said first area and said second area is an empty reference area devoid of sample and background material.

16. The method of claim 10, wherein said third area is an area that contains a material of interest and said fourth area is the sky.

17. The method of claim 16, wherein the noise-free data cube is free of spectral illumination components and spectral aerosol components leaving only the spectral components of the material of interest and the background in the noise-free data cube.

18. The method of claim 10, wherein said third area is an area that contains a material of interest and said fourth area is an area that has the same background where the material of interest is located but devoid of said material of interest.

19. The method of claim 18, wherein the noise-free data cube is free of spectral illumination components, spectral aerosol components and spectral background components leaving only the spectral components of the material of interest in the noise-free data cube.

* * * * *